No. 735,330. Patented August 4, 1903.

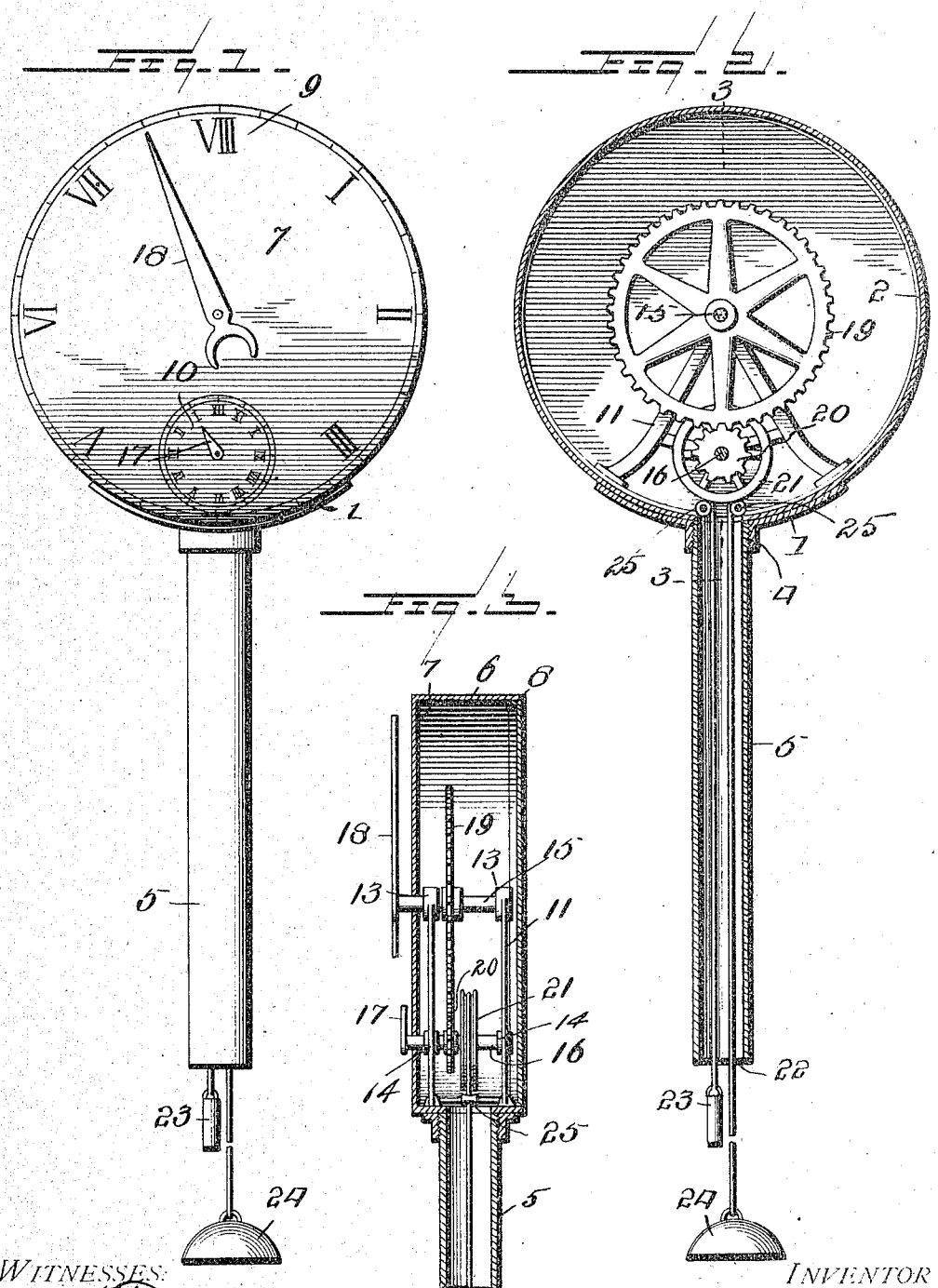

UNITED STATES PATENT OFFICE.

EUGENE WRIGHT, OF PLATO, IOWA.

DEPTH-GAGE FOR LIQUIDS.

SPECIFICATION forming part of Letters Patent No. 735,330, dated August 4, 1903.

Application filed April 6, 1903. Serial No. 151,358. (No model.)

*To all whom it may concern:*

Be it known that I, EUGENE WRIGHT, a citizen of the United States, residing at Plato, in the county of Cedar and State of Iowa, have invented certain new and useful Improvements in Depth-Gages for Liquids, of which the following is a specification.

This invention relates to an improved depth-gage for liquids possessing special utility as a register or gage for indicating the amount of water in underground reservoirs.

To this end the invention contemplates a simple, compact, and practical form of gage having a minimum number of working parts which are not liable to get out of order, while at the same time providing a gage or register structure especially useful on stock-farms and other places where it is desirable to know at all times the exact amount of water on hand.

A further object is to provide a construction which may be conveniently fitted or adapted to any kind of tank or reservoir for indicating the depth or amount of liquid therein.

With these and many other objects in view, which will more readily appear as the nature of the invention is better understood, the same consists in the novel construction, combination, and arrangement of parts, which will be hereinafter more fully described, illustrated, and claimed.

The essential feature of the invention, involved in the simple and compact arrangement of parts, is susceptible to some structural variation without departing from the scope of the invention; but a preferred embodiment of the latter is shown in the accompanying drawings, in which—

Figure 1 is a front elevation of a depth-gage constructed in accordance with the present invention. Fig. 2 is a vertical longitudinal sectional view of the device. Fig. 3 is a vertical sectional view on the line 3 3 of Fig. 2.

Like reference-numerals designate corresponding parts throughout the several figures of the drawings.

In carrying out the invention it is preferable to employ means whereby the several elements may be compactly arranged or united together. In the construction shown in the drawings this is accomplished through the medium of a supporting element designated by the numeral 1 and in the form of a curved saddle plate or casting in which is seated and suitably secured a cylindrical casing 2, designed to house and accommodate therein the registering mechanism for operating the hands or indicators.

In addition to providing a support for the cylindrical casing 2 the supporting-saddle 1 is preferably provided at one side thereof with an offstanding collar 3, in which is detachably fitted, by means of a threaded or equivalent joint 4, the upper end of a guiding and shielding tube 5, consisting, preferably, of a single-length pipe of sufficient extent to project well down into the reservoir or tank to provide guiding and shielding means for the elements of the device associated therewith.

The cylindrical casing 2 comprises the circular rim portion 6 and the front and rear circular heads 7 and 8, respectively, the front circular head having placed on the exposed face thereof the separate main and fractional scales 9 and 10, respectively, which are scaled to indicate the depth of liquid by feet and inches, the larger scale 9 showing the feet registered and the smaller scale 10 indicating the fractions or inches. The front head 7 of the casing therefore constitutes a register-dial over which plays the main and fractional indicating-hands.

The registering mechanism contained within the cylindrical casing 2 is of exceedingly simple and compact construction and is sustained as an entirety by an interior bracket-frame 11, mounted wholly within the casing and having downwardly-divergent leg-sections 12, secured at their feet upon the rim 6 at the base thereof and carrying separate pairs of upper and lower bearings 13 and 14, in which bearings are respectively journaled the upper main indicator-arbor 15 and the lower arbor 16. The said lower arbor 16 projects through the front dial 7 and carries upon its outer end the fractional hand or pointer 17, playing over the scale 10, while the outer end of the upper arbor 15 carries a main indicator-hand 18, sweeping over the graduations of the main scale 9 to indicate the depth in feet.

The upper arbor 15 has mounted thereon a single spur-wheel 19, meshing with a pinion 20 on the arbor 16, and the latter also carries a single peripherally-grooved motion-transmitting wheel 21, over which passes a single operating-cable 22. Both legs of the operating-cable 22 are guided or shielded within the tube 5, and to one extremity of the said cable is attached an adjusting-weight 23, while to the other extremity thereof is attached the controlling-float 24, which responds to the rise and fall of the liquid, and thus communicates motion in one direction or the other to the cable 22.

To insure the proper guiding of the separate legs or portions of the cable within the tube 5 and maintain the weight 23 inside of the vertical plane of such tube, there is employed a pair of oppositely-arranged antifriction guiding-rollers 25, journaled upon suitable supports inside of the casing contiguous to the wheel 21 and directly at the opening in the casing communicating with the tube 5.

The depth of liquid which the device will register depends upon the ratio of the gears and also upon the diameter of the motion-transmitting wheel; but this obviously can be varied to suit the conditions that the device or instrument is required to meet.

From the foregoing it is thought that the construction, operation, and many advantages of the herein-described device will be readily apparent without further description.

Having thus described the invention, what is claimed, and desired to be secured by Letters Patent, is—

1. In a depth-gage of the class described, a casing having an extended guiding and shielding tube pendent therefrom and provided with a dial embodying separate main and fractional scales, registering mechanism comprising intergeared arbors respectively carrying main and fractional indicating-hands playing over the separate scales, a single motion-transmitting wheel mounted upon one of the arbors, antifriction guiding-rollers arranged contiguous to said wheel at the upper end of the tube, and an operating-cable passed over said wheel between the rollers and having both legs thereof working in the tube, said cable carrying at one end a controlling-float and at its other end an adjusting-weight.

2. In a depth-gage of the class described, a supporting-saddle, a casing mounted on said saddle, a guiding and shielding tube detachably connected with the saddle and pendent therefrom, registering mechanism supported within the casing and including a single motion-transmitting wheel, a pair of spaced antifriction guiding-rollers arranged contiguous to said wheel at the upper end of the tube, and an operating-cable passed between said rollers and about the lower transmitting-wheel, said operating-cable carrying at one extremity a controlling-float and at its other end an adjusting-weight.

In testimony whereof I affix my signature in presence of two witnesses.

EUGENE WRIGHT.

Witnesses:
C. H. WICKERSHAM,
WM. BRENNER.